AUTOMATIC GAIN CONTROL OF AN AUDIO SYSTEM

Filed July 23, 1947

INVENTOR.
William W. H. Dean
BY Harry Turnick
ATTORNEY

UNITED STATES PATENT OFFICE 2,507,695

AUTOMATIC GAIN CONTROL OF AN AUDIO SYSTEM

William W. H. Dean, Pointe Claire, Quebec, Canada, assignor to Radio Corporation of America, a corporation of Delaware Application July 23, 1947, Serial No. 762,961

10 Claims. (Cl. 179—171)

Figures 1, 2:
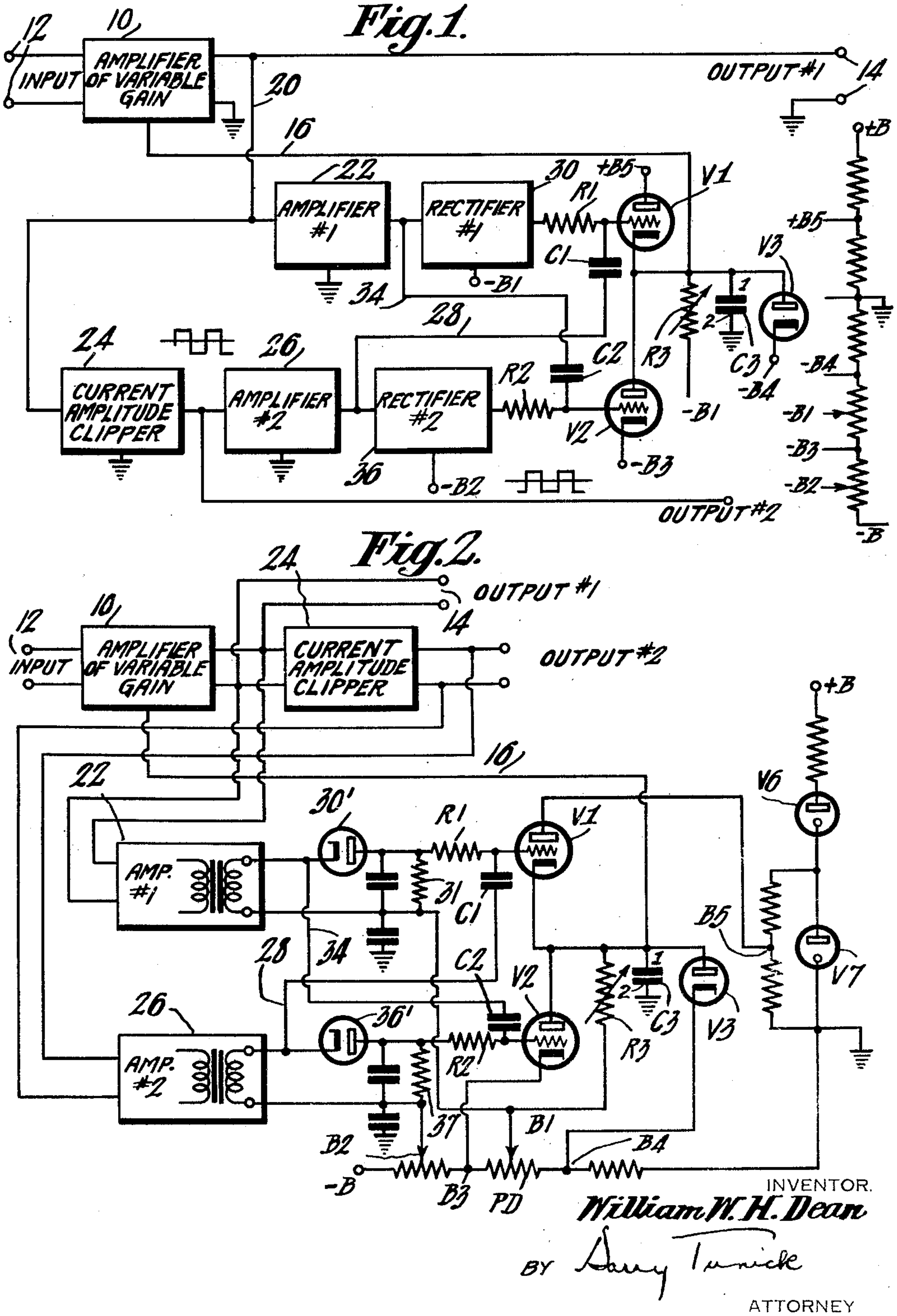

This application concerns audio amplifiers of controllable gain such as are used in speech program amplification for various uses such as modulation of carrier currents.

The primary purpose of my invention is to provide a simple circuit for instantaneously adjusting the gain of an audio amplifier with varying speech input so as to maintain its peak output constant.

In describing my invention in detail reference will be made to the attached drawings wherein I illustrate schematically and by block diagram in Figure 1 and by block diagram and circuit element and circuit element connections in Figure 2 a variable gain amplifier automatically controlled as to gain in accordance with my invention.

In the drawings, 10 represents the variable gain amplifier having an input at leads 12, and an output at leads 14. The variable gain amplifier is controlled as to gain by a biasing potential which is developed on lead 16 and applied to one or more tube stages in the amplifier. This potential operates as grid bias on amplifier tube stages in a manner too well known to warrant description herein.

The variable gain amplifier supplies output through lead 20 to an amplifier 22 referred to hereinafter as amplifier #1 and to a current amplitude clipper 24 used herein as a reference source. The clipper 24 has a constant amplitude output as indicated by the wave form above the lead and serves as a reference source as described hereinafter. The storage condenser which supplies the bias is designated C3 and is shunted by variable resistor R3 which slowly restores a fixed negative potential B1 to #1 terminal of C3 in the absence of signal. The storage condenser has a discharge path through the impedance of tube V1 which has its anode connected to the positive terminal of a source B5 and its cathode connected to the upper end of capacitor C3 and the anode of a tube V2 whose cathode is connected to a negative terminal of a source B3 more negative than B1. The tube V2 is in the condenser charging path since it permits a negative potential on the #1 condenser terminal to build up. The tube V1 is excited by output from the current amplitude clipper 24 after amplification in amplifier 26, herein designated as #2 amplifier. This excitation from amplifier #2 is by way of lead 28 and capacitor C1. Tube V1 is biased by output from amplifier #1 rectified in rectifier 30 herein designated as rectifier #1. This bias path includes the resistor R1.

The tube V2 is excited by output from amplifier #1 by lead 34 through capacitor C2 and derives its bias from rectifier 36 excited by the output of amplifier 26 and connected by resistor R2 to the grid of tube V2.

Referring to the drawing, a variable gain amplifier 10 is provided which is biased by the voltage appearing across capacitor C3. This bias is made to vary according to the peak signal level and thus adjust the gain of the amplifier to maintain constant peak amplitude of the output signal of 10. The voltage on capacitor C3 is made to vary by varying the conductivity of tubes V1 and V2 in the following manner. With no input signal, both tubes V1 and V2 are biased beyond cutoff by voltages B1 and B2 respectively. The voltage across capacitor C3 slowly varies due to resistor R3 until the voltage on terminal 1 of capacitor C3 approaches B1. The resulting negative voltage on terminal 1 of capacitor C3 reduces the gain of the variable gain amplifier 10 to a minimum during idle periods. Now, when a signal is applied at the input, it is amplified in the main amplifier 10 and in amplifier #1, rectified in rectifier #1, poled so that negative potential is developed on the grid of V1, so that raising the gain of the main amplifier 10 operates to increase the negative bias on the tube V1. At the same time signal amplified in the main amplifier is clipped at 24 and amplified in #2 amplifier. The clipped output signal of amplifier #2 is applied to tube V1 grid. The peak output signal of the clipper is constant and is adjusted to be greater than and overcome the bias, produced in rectifier #1, on the grid of tube V1 by the signal when the gain of the variable amplifier is minimum. The result is current flow in tube V1 to raise its cathode potential and cause a decrease in negative bias on the main amplifier. The voltage on capacitor C3 varies in the positive direction to increase the gain of the main amplifier until the bias on tube V1 (rectified current in #1 rectifier) has increased sufficiently to prevent the clipped signal amplified in #2 amplifier from overcoming the said bias thereby preventing conduction in tube V1 on clipped signal peaks. During this action, tube V2 has been biased negative by the clipped signal, rectified in #2 rectifier, and has had the amplified output signal from amplifier #1 applied to its grid. As the peak clipped signal, rectified in #2 rectifier, has exceeded the peak unclipped signal the grid of tube V2 has remained cut off. If, however, the signal increases further, causing the unclipped peak to exceed the clipped peak then tube V1 remains cut off, tube V2 conducts to provide a charging path for capacitor C3 and the voltage on capacitor C3 moves in the negative direction. The variable amplifier gain decreases until equilibrium is again restored.

From this it may be seen that the variable amplifier gain will be varied until the peak value of the output wave equals the peak of the clipped wave. This latter is a fixed value and serves as a reference. The clipper need not have sufficient sensitivity to start clipping when the weakest input signal is applied to the input when the variable amplifier is at minimum gain as the clipper output amplitude will exceed the input amplitude hence insuring that V1 conducts to increase the variable amplifier gain as already described.

The minimum gain of the amplifier, as previously mentioned, is set at the point at which tube V1 is biased to cut off in the absence of signal. To prevent the amplifier from attempting to reach an excessive gain, a diode V3, biased negative to a potential B4, is placed across capacitor C3. This limits the minimum negative bias on the variable gain amplifier to a safe value.

Resistor R3 may be varied to adjust the decay time of the amplifier gain. If this decay is made relatively fast, it will minimize background noise by, for example, reducing the gain between words or in pauses in speech originating in a noisy location. On the other hand by eliminating R3 entirely the gain would remain at the last operating level making this device operate as a voice operated gain adjusting device such as is used in telephone practice.

The apparatus used in units 10, 22, 24 and 26 of Figure 1 may be as known in the art and will not be described herein. The rectifiers 30 and 36 and their connections to the amplifiers and capacitor have been shown in Figure 2. The rectifiers #1 and #2 may be diodes 30' and 36' in rectifier circuits including load impedances 31 and 37 across which the rectified currents develop potentials the magnitude of which is proportional to the current intensity. The developed potentials are fed as bias, by resistors R1 and R2 respectively, to the control grids of tubes V1 and V2. The operation is as described in connection with Figure 1 and will not be repeated here. A source to supply the various direct current potentials used may take the form of a potential divider PD across a direct current source as shown in Figure 2. A point intermediate the ends of PD is grounded so that B4, B1, B3 and B2 are negative and increase in magnitude from the grounded point to reach a maximum value at B2. B5 is positive and is taken from a point between two resistors in series across one tube of two voltage regulator tubes V6 and V7 in series across the direct current source.

The advantage of such an amplifier is apparent in radio communication systems for maintaining high modulation levels. The present circuit is much less complicated than the voice operated gain adjustment device used in telephone systems for the same purpose. A further advantage is that a clipped output may be obtained at the #2 output for use in increasing the average modulation of a carrier as described more in detail in my U. S. application Serial Number 758,693, filed July 2, 1947. Here, as in said application, noise is suppressed in the absence of signals because the output of the main amplifier is reduced to a point below that at which 24 starts clipping. The clipper 24 per se may be like the clipper stage 42 of said application. The voltage amplifier and phase reverse portion of said application may then be of variable gain and may replace amplifier 10 of this application. Furthermore, by proper choice of gains, the degree of clipping may be maintained at the optimum value over a considerable range of inputs.

What is claimed is:

1. In apparatus for automatically holding the amplitude of signals at the desired level, a variable gain amplifier having an input excited by signal voltage and having an output wherein the amplified voltage appears, a storage capacitor across which a potential is developed and fed to said amplifier to control its gain, means for developing voltage of fixed level only when said signal voltage excites said amplifier, two electron discharge tubes each having a control grid and having their internal impedances in series across a potential source, a connection between a point on said series connection, intermediate the tube impedances, and said capacitor, means for applying a bias to one grid which is a measure of the average magnitude of the amplifier's output, means for applying said voltage of fixed level from said first-named means to said last named grid, means for applying a bias to the other grid which is a measure of the average magnitude of said voltage of fixed level, and means for applying voltage from said amplifier to said last named grid.

2. Apparatus as recited in claim 1, including a source of potential and a resistor connected to said capacitor to place a base charge thereon, in the absence of signal voltage excitation of said amplifier of variable gain, after a time interval measured by the magnitude of said resistor.

3. Apparatus as recited in claim 1 wherein said first-named means is a limiting amplifier excited by the signal voltage.

4. Apparatus as recited in claim 1 wherein said capacitor is shunted by a diode to limit the charge on said capacitor.

5. In apparatus for automatically holding the amplitude of signals at the desired level, a variable gain amplifier having an input excited by signal voltage and having an output wherein the amplified voltage appears, a capacitor across which a potential is developed and fed to said amplifier to control its gain, a voltage clipper excited by the signal voltage for developing voltage of fixed level only when said signal voltage excites said amplifier, two electron discharge tubes each having a control grid and having their internal impedances in series across a potential source, a connection between a point on said series connection, intermediate the tube impedances, and said capacitor, a rectifier excited by signal voltage for applying a bias to one grid which is a measure of the average magnitude of the amplifier's output, connections for applying said clipper voltage of fixed level from said clipper to said last named grid, a rectifier excited by voltage from said clipper for applying a bias to the other grid which is a measure of the average magnitude of said voltage of fixed level, and connections for applying amplified voltage from said amplifier to said last named grid.

6. Apparatus as recited in claim 5 including a resistor and a source of direct current potential connected to said capacitor to place a base charge thereon.

7. Apparatus as recited in claim 5 including a charge limiting diode in shunt to said capacitor.

8. In apparatus for automatically holding the amplitude of signals at a desired level, a variable gain amplifier having an input excited by signal voltage and having an output wherein the amplified signal voltage appears, a capacitor the potential across which is fed to said amplifier to control its gain, means coupled to the output of said amplifier for producing from the amplified signal voltage a voltage of fixed level, means responsive to the output of said amplifier and to said voltage of fixed level for producing a potential when the amplifier output voltage is above said fixed level, other means responsive to the output of said amplifier and to said voltage of fixed level for producing a potential when the amplifier output voltage is below said fixed level, said produced potentials varying in opposite directions with respect to a reference potential, and connections for impressing said produced potentials on said capacitor.

9. In apparatus for automatically holding the amplitude of signals at a desired level, a variable gain amplifier having an input excited by signal voltage and having an output wherein the amplified signal voltage appears, a capacitor the potential across which is fed to said amplifier to control its gain, means coupled to the output of said amplifier for producing from the amplified signal voltage a voltage of fixed level, means responsive to the output of said amplifier and to said voltage of fixed level for producing a potential when the amplifier output voltage is above said fixed level, other means responsive to the output of said amplifier and to said voltage of fixed level for producing a potential when the amplifier output voltage is below said fixed level, said produced potentials varying in opposite directions with respect to a reference potential, connections for impressing said produced potentials on said capacitor, and means for establishing a selected potential across said capacitor in the absence of signal voltage excitation of said amplifier.

10. In apparatus for automatically holding the amplitude of signals at a desired level, a variable gain amplifier having an input excited by signal voltage and having an output wherein the amplified signal voltage appears, a capacitor the potential across which is fed to said amplifier to control its gain, means coupled to the output of said amplifier for producing from the amplified signal voltage a voltage of fixed level, means responsive to the output of said amplifier and to said voltage of fixed level for producing a potential when the amplifier output voltage is above said fixed level, other means responsive to the output of said amplifier and to said voltage of fixed level for producing a potential when the amplifier output voltage is below said fixed level, said produced potentials varying in opposite directions with respect to a reference potential, connections for impressing said produced potentials on said capacitor, and a resistor and a potential source connected across said capacitor for establishing a selected potential thereacross in the absence of signal voltage excitation of said amplifier.

WILLIAM W. H. DEAN.

REFERENCES CITED

The following references are of record in the file of this patent:

UNITED STATES PATENTS

| Number | Name | Date |
|---|---|---|
| 2,316,354 | Moritz, Jr. | Apr. 13, 1943 |
| 2,402,445 | Poch | June 18, 1946 |